(12) United States Patent
Voelkl et al.

(10) Patent No.: US 12,004,524 B2
(45) Date of Patent: Jun. 11, 2024

(54) CUTTING DEVICE AND PROCESS FOR CUTTING A PRODUCT

(71) Applicant: TVI ENTWICKLUNG & PRODUKTION GMBH, Irschenberg (DE)

(72) Inventors: Thomas Voelkl, Bruckmuehl (DE); Dominik Rothenaichner, Bruckmuehl (DE)

(73) Assignee: TVI ENTWICKLUNG & PRODUKTION GMBH, Irschenberg (DE)

( * ) Notice: Subject to any disclaimer, the term of this patent is extended or adjusted under 35 U.S.C. 154(b) by 1024 days.

(21) Appl. No.: 16/865,966

(22) Filed: May 4, 2020

(65) Prior Publication Data

US 2020/0345019 A1 Nov. 5, 2020

(30) Foreign Application Priority Data

May 3, 2019 (DE) .......................... 102019111508.6

(51) Int. Cl.
*A22C 17/00* (2006.01)
*A22C 17/02* (2006.01)

(52) U.S. Cl.
CPC .......... *A22C 17/0006* (2013.01); *A22C 17/02* (2013.01)

(58) Field of Classification Search
CPC .. A22C 17/0006; A22C 17/02; A22C 17/0033
USPC ........................................................ 452/148
See application file for complete search history.

(56) References Cited

U.S. PATENT DOCUMENTS

| 1,168,822 | A | | 1/1916 | Newell | |
|---|---|---|---|---|---|
| 3,177,520 | A | | 4/1965 | Vogt et al. | |
| 3,771,196 | A | | 11/1973 | Doerfer et al. | |
| 5,342,236 | A | * | 8/1994 | Repisky | B26D 1/24 |
| | | | | | 452/142 |
| 6,688,961 | B2 | * | 2/2004 | Smith | B26D 3/30 |
| | | | | | 452/160 |

FOREIGN PATENT DOCUMENTS

| DE | 699 17 718 T2 | 5/2005 |
|---|---|---|
| DE | 10 2004 041 881 A1 | 10/2006 |
| DE | 602 09 640 T2 | 2/2007 |
| EP | 0 985 348 A2 | 3/2000 |
| EP | 1 059 037 A2 | 12/2000 |

(Continued)

OTHER PUBLICATIONS

European Search Report Dated Sep. 24, 2020, Application No. 20172362.4 -1011, Applicant TVI Entwicklung und Produktion GmbH, 9 Pages.

(Continued)

*Primary Examiner* — Richard T Price, Jr.
(74) *Attorney, Agent, or Firm* — Brooks Kushman P.C.

(57) ABSTRACT

A dividing device is used for dividing a piece of meat with bone contained therein, in particular for cutting off a slice, which device has, in particular on a supporting body, both a moving blade and a moving saw, in order to have to saw through only the rigid part of the piece of meat with the saw and, usually overlapping in time or afterwards, to cut the elastic part with the blade, but if possible in the same cutting-gap of the saw.

19 Claims, 8 Drawing Sheets

(56) References Cited

FOREIGN PATENT DOCUMENTS

EP          1 228 693 A1     8/2002

OTHER PUBLICATIONS

German Search Report Application No. 10 2019 111 508.6 Dated Apr. 24, 2020, Letter identifiers that indicate relevance of the cited documents, Abstract & Machine Translation.
German Office Action Dated Apr. 24, 2020, Application No. 10 2019 111 508.6, Applicant TVI Entwicklung und Produktion GmbH, 7 Pages.

* cited by examiner

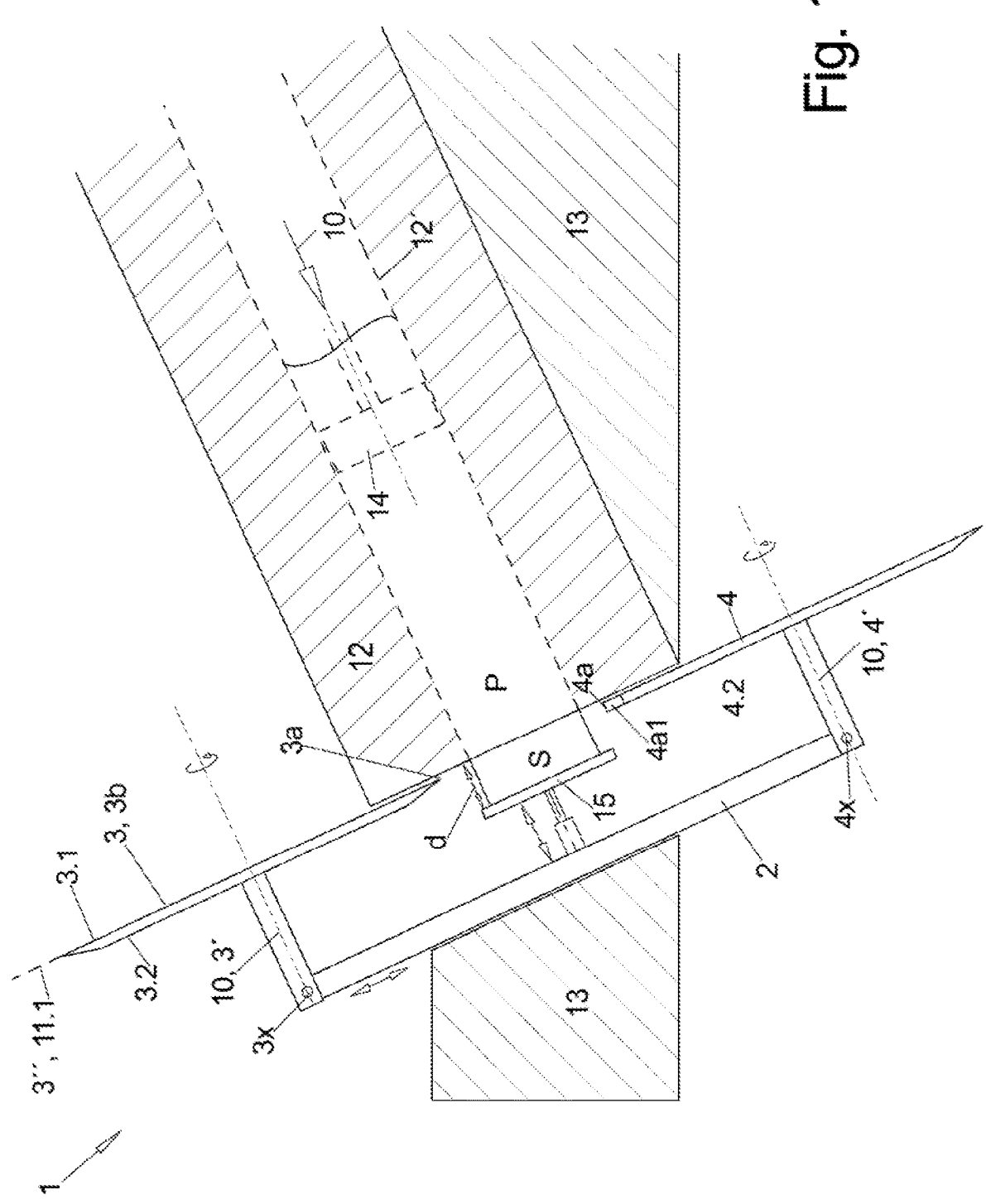

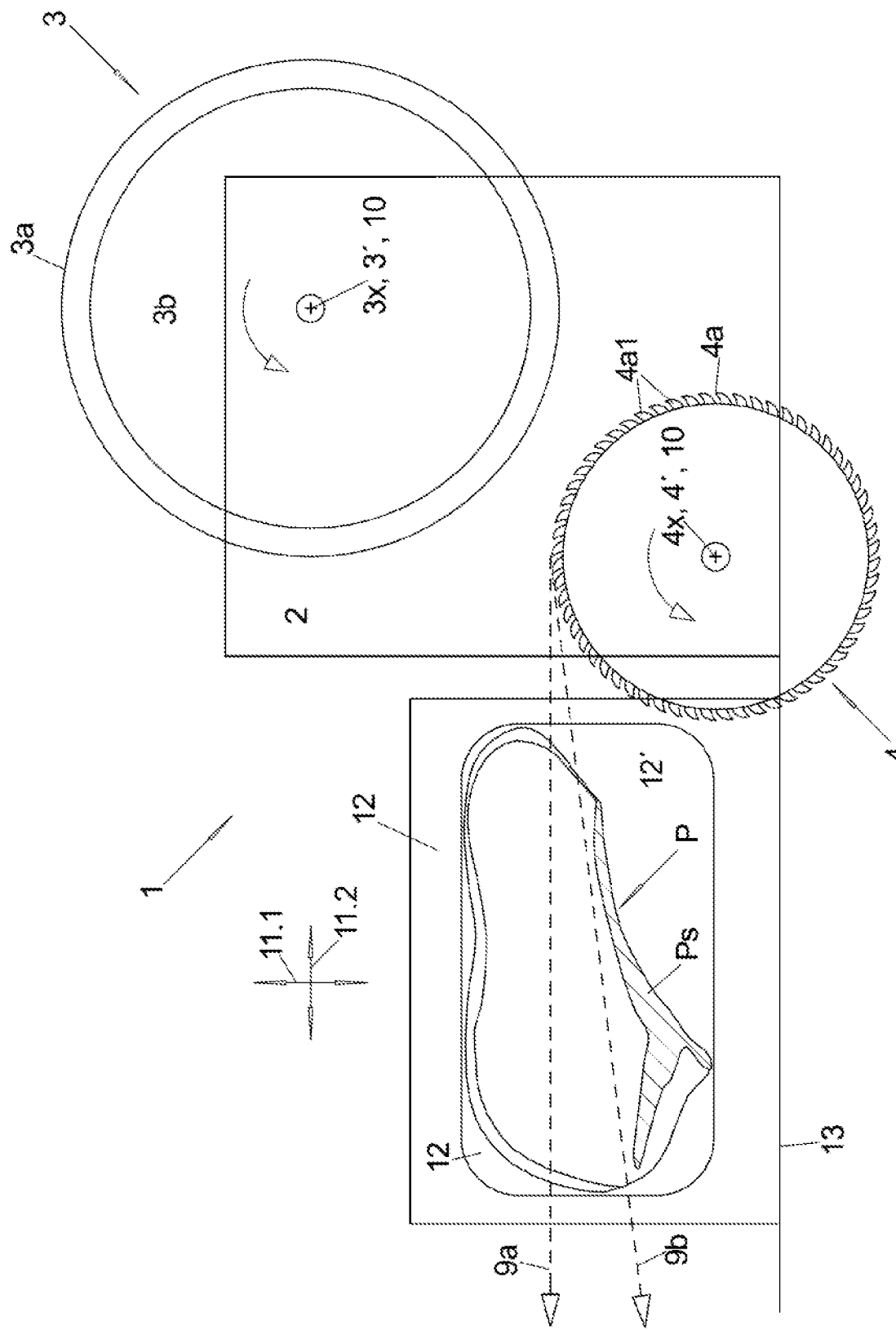

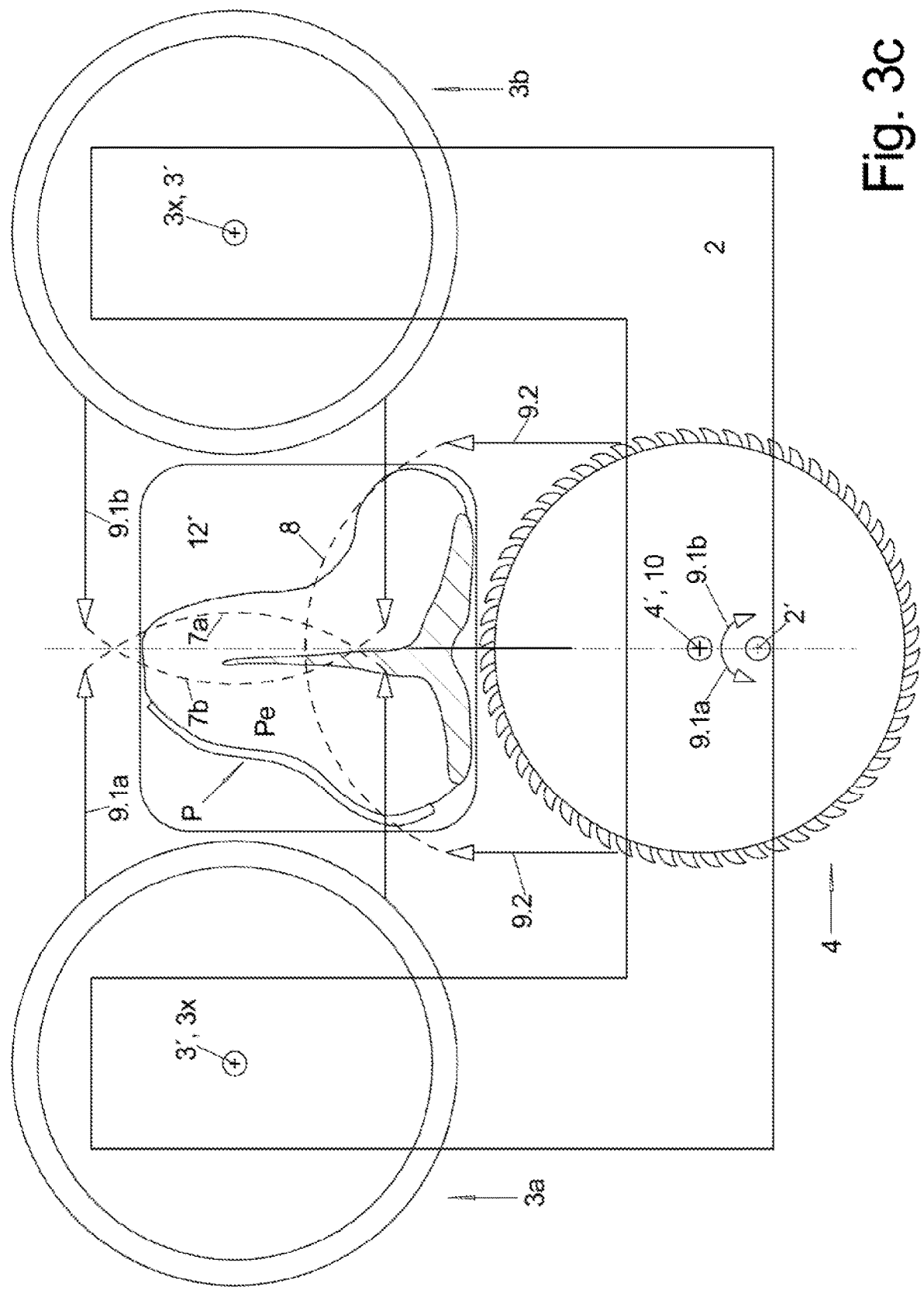

CUTTING DEVICE AND PROCESS FOR CUTTING A PRODUCT

CROSS-REFERENCE TO RELATED APPLICATIONS

This application claims foreign priority benefits under 35 U.S.C. § 119(a)-(d) to German patent application No. 102019111508.6 filed May 3, 2019, which is incorporated by reference in its entirety.

TECHNICAL FIELD

The invention relates to the dividing of a product, in particular into slices, which in addition to an elastic portion also has a less elastic, hard and so-called rigid portion, in particular a piece of meat with bone contained therein.

BACKGROUND

In the context of the present invention, a so-called elastic portion is understood to be one which, although it is not completely elastic, can also behave plastically in part, but can be compressed at least in one direction by more than 10%, better than 20%, better than 30%.

By contrast, a hard and rigid portion is understood to be that which—at least in one direction—can hardly be compressed, i.e. which can be compressed in this direction in its dimension up to the breaking point of this rigid portion by a maximum of 10%, better by a maximum of only 5%, better by a maximum of only 3%.

When such a product, in particular a piece of meat, is cut up manually, the elastic part is cut up with a blade and the rigid part, in particular the bones, is either chopped apart with a hatchet or sawed apart with a saw, whether a hand-operated saw or a motor-driven saw.

The operator can individually adjust his cutting and sawing movements to the size and shape of the product and its two components.

The aim here is to prevent the saw from penetrating the elastic component, or to do so as little as possible, on the one hand to avoid the loss of material caused by the sawing slit produced and on the other hand to minimise the contamination of the cut surfaces of the product with sawdust.

However, if such cutting is to be carried out automatically by means of a machine, whereby products of similar quality and quantity are to be cut up, it is difficult to achieve this because the products are not identical even within a batch.

SUMMARY

It is therefore the object according to the invention to provide an automatic dividing device as well as a dividing method with which products with both elastic and rigid portions can be divided by means of a blade on the one hand and a saw on the other hand in such a way that the saw cuts as little of the elastic portion as possible and in particular leaves as little sawdust on the product as possible.

With regard to the automatic dividing device, this task is solved by the fact that it comprises not only a blade but also a saw, which are arranged on the base frame, preferably on a common supporting body.

This means that an elastic component and a rigid component can be cut up by the appropriate tool, i.e. saw or blade, without the saw having to pass through the entire elastic component and chip it in the saw slot.

At least the blade or saw is movable relative to the base frame, in particular the supporting body, and in particular the supporting body itself is movable relative to the product to be divided, i.e. the base frame and a product holder attached to it.

This is because the blade should preferably be able to make a drawing cut, i.e. its sharp cutting edge should not only be pressed into the product perpendicularly to the direction of the cutting edge, but the direction of penetration of the blade should have as large a component as possible in the direction of the cutting edge at the cutting point.

Preferably, the blade is a circular disc or sickle-shaped blade rotating on the supporting body with the cutting edge defining the cutting plane along the outer circumference of its base body.

The saw also requires a relative movement to the product and thus to the product holder in one direction along its sawing edge, i.e. the outer circumference of its body where the teeth are located, in order to achieve a sawing effect on the product.

These relative movements can be realized by the—rotating or oscillating—movement of the blade and saw in relation to the base frame, especially to the supporting body, and/or of the supporting body in relation to the base frame, especially for product holder.

Both the blade and the saw, in particular its main body, are preferably plate-shaped, but this should not preclude flexible plates, as in the case of a band saw blade.

The sawing plane is the plane running in the middle of the thickness of the plate-shaped basic body, i.e. in the middle between its main surfaces.

For the purposes of the present invention, teeth or saw teeth are defined as projections which project outwards beyond the edge of the plate-shaped saw body and are spaced apart in the circumferential direction of the saw body by spaces between the teeth. At their radially outer end they have a cutting edge, the direction of which has in particular also components transverse to the main plane of the plate-shaped saw body.

The saw edge can have a width—viewed in the direction of the saw edge and measured in the thickness direction of the saw body—which is greater than the thickness of the saw body. This is usually achieved by the so-called entanglement of the teeth, i.e. bending the teeth alternately beyond one main surface and the other main surface of the plate-shaped saw body, while the width of the individual tooth usually only corresponds to the thickness of the saw body.

However, the teeth of the saw can also not be crossed.

The width of the sawing edge is limited by one sawing slot plane each, which runs parallel to the main plane of the saw body. The main plane of the plate-shaped saw body is preferably the middle plane between the two main surfaces, i.e. front and rear side, of the saw body, which usually has a constant thickness.

Preferably in the context of the invention, however, the saw edge is not wider than the thickness of the saw body measured in the thickness direction thereof, but preferably even somewhat narrower, whereby in particular the teeth at their free end may have a smaller width in the axial direction than the thickness of the saw body, but preferably a width which is at most 20% smaller.

As a result, the product to be cut is always in reliable contact with the two main surfaces of the saw during the sawing process, so that the sawdust produced during cutting is pushed into the tooth spaces or sawdust bags or sawdust breakthroughs in the saw body and hardly remains on the product.

Blade and saw can preferably be driven independently of each other, especially with regard to speed and direction, so that they can move in particular simultaneously or alternately.

Preferably, knives and/or saws are movably arranged on the supporting body at fixed mounting positions around which they can be rotated or swivelled or otherwise moved.

For special dividing tasks, however, the fixing positions can also be movable relative to one another, either actively controlled movable or also passive, for example, force-actuated such as spring-loaded, preferably in the direction of penetration.

As a result, the blade and saw should be designed and/or dimensioned and/or positioned on the base frame, in particular on the supporting body, in such a way that when cutting a specific product, the saw penetrates the elastic portion as little as possible when sawing the rigid portion of the product, so as not to cause material loss through sawn material, nor leave too much sawdust behind, which is produced from the rigid portion.

In order that the sharp cutting edge of the blade can also cut through slightly rigid parts of the product, the rigidity of which is greater than that of the elastic part but less than that of the rigid part of the product, the sharp cutting edge may also have a wave or zigzag shape when viewed from the cutting plane.

The blade is preferably positioned at the supporting body in such a way that its cutting plane is between the saw slot planes or the outermost of more than two saw slot planes, where there are several saws, or coincides with one of these outer saw slot planes. Where there are several blades present, this shall preferably apply to all blades.

If several blades are present at a cutting device, their cutting planes can preferably be identical, whereby in particular the usually convex curved rear sides of the blades point in the same direction. This is because, when one blade moves into a cutting gap already created by the other blade—as is necessary when cutting through the product—the cut-off part, especially the slice, is pushed away in the same direction as from the first blade.

If, on the other hand, the blades, in particular two blades, face away from each other with their curved rear sides, their cutting planes may also be slightly spaced apart and, in particular, parallel, with a distance of preferably less than 2 mm, better less than 1 mm. This allows the cutting edges of the two blades to be arranged very close together or even overlapping in the direction of the cutting planes.

If several saws, in particular two saws, are present at a cutting device, the thickness of the main bodies and/or the width of the saw edge of the saws is preferably the same, and their two saw slot planes coincide.

If this is not possible because, for example, a saw has a smaller thickness of the body and/or a smaller width of the saw edge, the saw slot planes of the thinner saw are preferably between those of the thicker saw. This ensures that when a saw slot produced by one saw is reached by the other saw, the offset of the resulting two saw slot planes on the product remains as small as possible.

In most cases, the product to be sliced is a meat strand with such a proportion of bone that
on the one hand, has a longitudinal bone, usually part of the animal's backbone, running in the longitudinal direction, which is the greatest direction in which the meat strand extends, usually over its entire length, and on the other hand from the longitudinal bone in longitudinal distances in transverse direction, usually perpendicular to it, has transverse bones, usually ribs of the animal.

The meat strand is arranged with its longitudinal direction lying in the longitudinal direction of the product holder, in particular of the forming tube, and is pushed forward therein in the longitudinal direction and the slices are cut off perpendicular thereto, so that the cutting plane, i.e. blade plane and/or sawing plane, lies transverse, in particular perpendicular, to the longitudinal direction of the product holder, in particular of the forming tube and thus of the longitudinal bone.

Since the longitudinal position of the cutting plane on the meat strand cannot be freely selected, e.g. between the transverse bones, when producing slices with a specified nominal weight, the transverse bone must often also be cut along its main extension when cutting off a slice.

The rigid portion shown in the figure description is a cut through the transverse bone along its main extension and, if necessary, the longitudinal bone if it connects the transverse bones shown.

In most cases the transverse bone is located at or near the edge of the cross-section of the meat strand and, when slicing, is often located against or opposite an inner surface of the forming tube, with at most a small thickness of an elastic portion between them.

With regard to the method for dividing a product, the object is solved by ensuring that the saw penetrates the elastic component as little as possible when sawing the rigid component, and in particular for this purpose the saw is positioned accordingly relative to supporting saw body and/or the type of movement of the saw and/or its shape and size is selected accordingly.

In this context, "as little as possible" may mean, on the one hand, that the advance of the saw is stopped and the saw is moved back as soon as the rigid part of the product to be cut by the saw is completely cut through by the saw, or after a further maximum of 10 mm, better a further maximum of 5 mm, of the advance of the saw into the elastic part.

On the other hand, "as little as possible" can mean that penetration of the saw into the product, especially in the direction of the blade, i.e. perpendicular to the direction of its sawing edge and in the main plane of the saw, is stopped and the saw is moved back at the latest when the distance required to cut the rigid portion is exceeded by more than 10%, better more than 5%.

If products have slightly rigid areas whose rigidity lies between that of the elastic component and that of the rigid component, such areas—depending on their size measured in the direction of penetration of the blade or saw—may be cut by means of the blade instead of the saw, especially if the blade has a waved or zigzag cutting edge when viewed from the cutting plane.

Preferably, the sawing and cutting up is not carried out completely simultaneously, but at best overlapping or even completely following each other, starting in particular with the cutting up of the rigid part by the one or more saws and then the cutting up of the elastic part by the one or more knives.

Preferably, the blade is already advanced as far as possible into the product while the saw is still in the product, but preferably already in the retraction movement out of the product. This means that the product is still held by the saw in the axial direction, i.e. transverse to the cutting plane.

BRIEF DESCRIPTION OF THE DRAWINGS

Types of exemplary embodiments according to the invention are described in more detail below as examples, with reference to the following drawings which show:

FIG. 1: a dividing device viewed from the side, transverse to the axial direction, FIGS. 2a, b: different dividing devices for the same product, viewed in axial direction, FIGS. 3a-c: different dividing devices for different products.

DETAILED DESCRIPTION

Figure 2B:
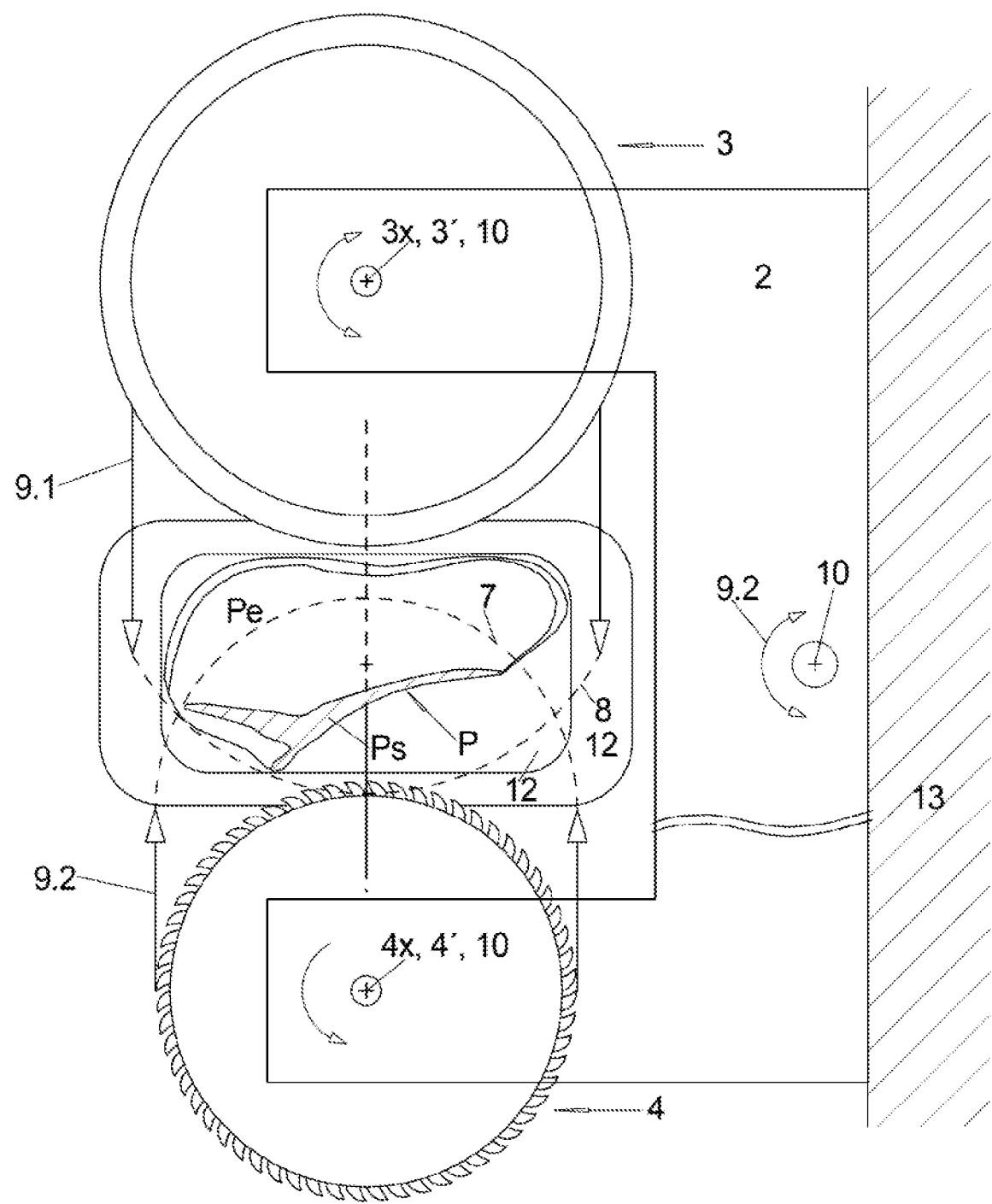

FIG. 1 shows a cutting device 1 with a rotating circular disc-shaped blade 3 and a rotating circular disc-shaped saw 4 in side view, i.e. viewed transversely to their axes of rotation 3', 4'.

The strand-like or loaf-like product P to be cut is received in a product holder 12, here the forming tube cavity 12' of a circumferentially closed forming tube 12 which is open at the front end and inclined obliquely downwards at the front and is pushed forward beyond its front end face by a longitudinal press punch 14 in the longitudinal direction 10 which in this case coincides with the axial direction in the form of the axes of rotation 3' and 4' of blade 3 and saw 4.

In this case, this is pushed forward to a stop plate 15, the distance of which is adjustable in relation to the front face of the forming tube 12 and determines the thickness d of the slice S to be cut off from the product P, because the protrusion of the product P over the front face of the forming tube 12 is cut off directly before this face by the blade 3 on the one hand and the saw 4 on the other.

In this case, the plate-shaped blade 3 with its rear side 3.2, convexly curved by the sloping cutting surface 3a, is arranged on the side facing away from the product holder 12, so that the cutting plane 3", defined in particular by the circular cutting edge 3a, can be located directly at the end face of the forming tube 12.

Figure 5:
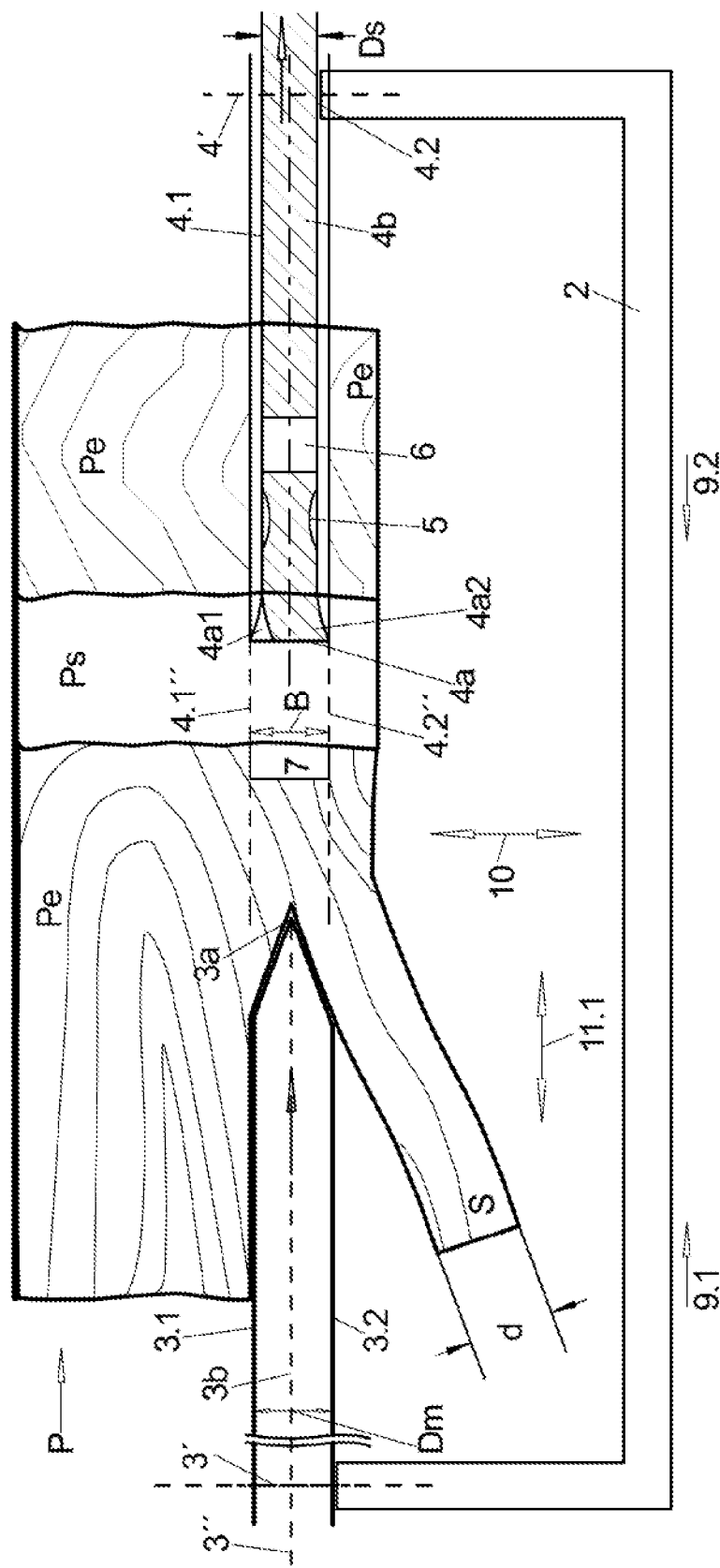
FIG. 5: an axial section through the dividing device during the dividing process.

FIG. 5 shows in this context—with the forming tube 12 omitted for reasons of clarity—the dividing process of a product P, whose rigid component Ps is surrounded on both sides by elastic components Pe in this view, in an enlarged sectional view:

To cut off a slice S, a saw 4 had first penetrated the product P from the right through the elastic component Pe present there in a transverse direction 11.1, the direction of penetration 9.2 of the saw 4, and had subsequently also completely cut through the rigid component Ps and had penetrated a small distance into the elastic component Pe there on the opposite side, leaving a saw slot 7 with the width B of the saw edge 4a. The saw 4 was then moved back against the direction of penetration 9.2.

FIG. 5 shows the saw 4 during this backward movement.

It can be seen that the width B of the saw edge 4a is greater than the thickness Ds of the saw body 4b, which is radially adjacent to the teeth 4a1 towards the inside, towards the saw axis 4', because the saw teeth 4a1, 4a2 alternate to the side, i.e. over the front side 4.1 and rear side 4.2 of the saw body 4b, and thus the distance between the two saw slot planes 4.1" and 4.2", determined by the width of the saw edge 4a, is greater than the thickness Ds of the body 4b, which lies between these planes 4.1" and 4.2".

In addition, sawdust bags 5 in the form of recesses and/or sawdust breakthroughs 6 are shown on both sides 4.1, 4.2 of the saw body 4b, which run completely through the thickness of the body 4b and in which the sawdust produced during sawing, especially sawing the rigid portion Ps, is to be collected in order to transport it out of the product area.

In a direction of penetration 9.1, which in this case is exactly opposite to the direction of penetration 9.2 of the saw 4, a blade 3 already penetrates the elastic part Pe from the other, left-hand side, and also begins to separate the slice S from the main part of the product P.

This penetration movement may have already started while the saw 4 is penetrating the product P—if blade 3 and saw 4 are independently controlled in their penetration movement—or it may have only started with or after the end of the penetration movement of the saw 4, for example if blade 3 and saw 4 are fixed at fixed fixing positions 3x, 4x on a common supporting body 2.

The blade 3 shown has a symmetrical cross-section in the radial sectional view of FIG. 5. The cutting edge 3a defines the cutting plane 3" of the blade 3 and a cutting surface running at an angle to the cutting plane is connected radially inwards to the cutting edge 3a both on the front side of the blade 3.1 facing the main part of the product P and on the rear side of the blade 3.2 facing away from it. The cutting plane 3" is located in axial direction 10 between the two sawing slot planes 4.1" and 4.2", i.e. in the thickness range of the sawing slot 7 produced by the saw 4.

As can be seen, both the cutting surface of the slice S and the cutting surface of the remaining main part of the product P will have a small shoulder at the point where the cutting edge 3a of the blade 3 reaches the saw slot 7 already made by the saw 4, but this is optically acceptable given a width B of the saw slot 7 of less than 5 mm and a thickness Dm of the blade body 3b of less than 3 mm.

FIG. 5 also shows that the saw 4 causes a loss of elastic material Pe only in the relatively narrow elastic portion Pe, which the saw 4 must penetrate to reach the rigid portion Ps.

This can be kept even lower if the saw teeth 4a1, 4a2 are not interlocked, so that the width B of the cutting edge 4a is the same or even smaller than the thickness Ds of the saw body 4b of the saw 4, because in the latter case the saw 4 produces a wedge effect behind its cutting edge 4a, which minimizes material cutting in the elastic component Pe, but increases the resistance during cutting when sawing the rigid component Ps and partially leads to splitting of this rigid component Ps, which may however be acceptable depending on the material properties of this rigid component.

Both the blade 3 and the saw 4 are fixed to a supporting body 2 at a fixing position 3x and 4x respectively, which in this case cannot be changed.

The supporting body 2 can be moved along the blade plane 3" relative to a base frame 13 in a transverse direction 11.1 together with blade 3 and saw 4. The product holder 12 is also attached to this base frame 13, while the stop plate 15 is preferably attached to the supporting body 2, in particular with adjustable distance to the supporting body 2.

FIGS. 2a, 2b show procedures for cutting a bone-in cutlet strand as product P viewed in axial direction 10.

It can be seen that the meat side of the chop, i.e. the large elastic portion Pe, is roughly in contact with the upper inner surface and the two adjacent inner curves of the approximately rectangular cross-section of the forming tube cavity 12', the corners of which are highly rounded, and in practice is often even pressed against the rigid portion Ps from below or to the bottom right by a transverse pressing punch which is not shown.

The approximately strip-shaped rigid part Ps then runs approximately horizontally, dropping slightly to the bottom left.

FIG. 2a shows an embodiment of the cutting device 1, in which the blade 3 on the one hand and the saw 4 on the other hand are fixed to a supporting body 2 at fixed fixing positions 3x, 4x.

The supporting body 2 can be moved, for example, in a 1st penetration direction 9a relative to the product holder 12, which follows the direction of one of the edges of its rectangular cross-section, namely the edge on which the meat portion, i.e. the elastic portion Pe, lies. Another possibility would be a penetration direction 9b, which corresponds to the direction of the upper side of the rigid portion Ps, which in this view slopes downwards to the left.

In the penetration direction 9a or 9b, the fixing positions are 3x, 4x spaced apart, whereby in penetration direction 9 the fixing position is 4x further forward, so that when the supporting body 2 moves in penetration direction 9 the saw 4 is the first to reach the product P.

The fixing positions 3x and 4x are also spaced apart transversely to the direction of penetration 9, in that the fixing position 3x of the blade 3—viewed in the longitudinal direction 10—is located above that inner surface of the product receptacle 12 and/or of the product P where its elastic component Pe is located, and the fixing position 4x is located below the product receptacle 12, in particular the inner surface of the forming tube 12 to which the rigid component Ps is adjacent.

Otherwise the two fixing positions 3x, 4x can be arranged so close to each other that blade 3 and saw 4 almost touch each other, whereby an overlap in this viewing direction of blade 3 and saw 4 must be perpendicular to the penetration direction 9a or 9b—which are identical in this case because of the fixed fixing positions on the supporting body 2.

From the starting position shown in FIG. 2a, in which blade 3 and saw 4 are located on one side completely outside the product P, in particular the forming tube cavity 12', the supporting body 2 moves in the direction of penetration 9a or 9b to such an extent that both blade 3 and saw 4 pass completely through the product P, in particular the forming tube cavity 12', thereby cutting a slice from the product P.

In contrast, in the embodiment according to FIG. 2b, blade 3 and saw 4 are arranged opposite each other with respect to the forming tube 12 at such a distance that the free space between them is as large as the cross-section of the inner free space 12' of the forming tube 12 in this direction.

Accordingly, the penetration direction 9.1 of blade 3 is opposite to the penetration direction 9.2 of saw 4.

In this case the supporting body 2 is U-shaped in the direction of view of FIG. 2b and at the free end areas of its free ending legs the rotating blade 3 on the one hand and the rotating saw 4 on the other hand are mounted rotatingly.

However, this shape of the supporting body 2 is not a prerequisite for realisation, since if the supporting body 2 is arranged in axial direction 10 sufficiently far from the front end face of the product holder 12—as FIG. 1 shows—a plate or rod shape of the supporting body 2 is also possible, which connects the two axes of rotation 3', 4' with each other.

As shown in FIG. 2b, starting from the position shown, by moving the supporting body 2 in the direction of penetration 9.2—in this case the direction of the line joining the two axes of rotation 3' and 4', but this is not a condition—the saw 4 can first be moved into the product until the rigid part Ps is completely cut through, then the supporting body 2 can be moved back and thus the blade 3 in the direction of penetration 9.1 must be moved forward until it has penetrated into the product P to such an extent that it has reached the saw slot 7 created by the saw 4 over the entire width of the product P transversely to its direction of penetration 9.1, thus separating the slice from the product P.

Then the supporting body 2 is moved back to the starting position shown in FIG. 2b in order to be able to push the product P forward against the direction of view in axial direction 10.

FIG. 2b also shows that the overlapping of the penetration depth of blade 3 and saw 4 must be chosen so that the smaller the diameter of these two tools, especially saw 4, the greater the overlapping of the penetration depth of blade 3 and saw 4, and therefore the greater the proportion of elastic component Pe cut by saw 4, and therefore the larger the diameter of these two tools, especially saw 4, should be chosen.

A transverse offset of one or both axes of rotation 3', 4' with respect to the direction of penetration 9.1, 9.2 is recommended if the elastic component Pe and the rigid component Ps are distributed asymmetrically in this transverse direction in order to ensure that the blade axis 3' in the direction of penetration 9a passes as far as possible through the geometrical central region of the cross-section of the elastic component Pe and, conversely, the saw axis 4' in the direction of penetration 9.2 passes as far as possible through the geometrical central region of the cross-section of the rigid component Ps.

Figure 3A:
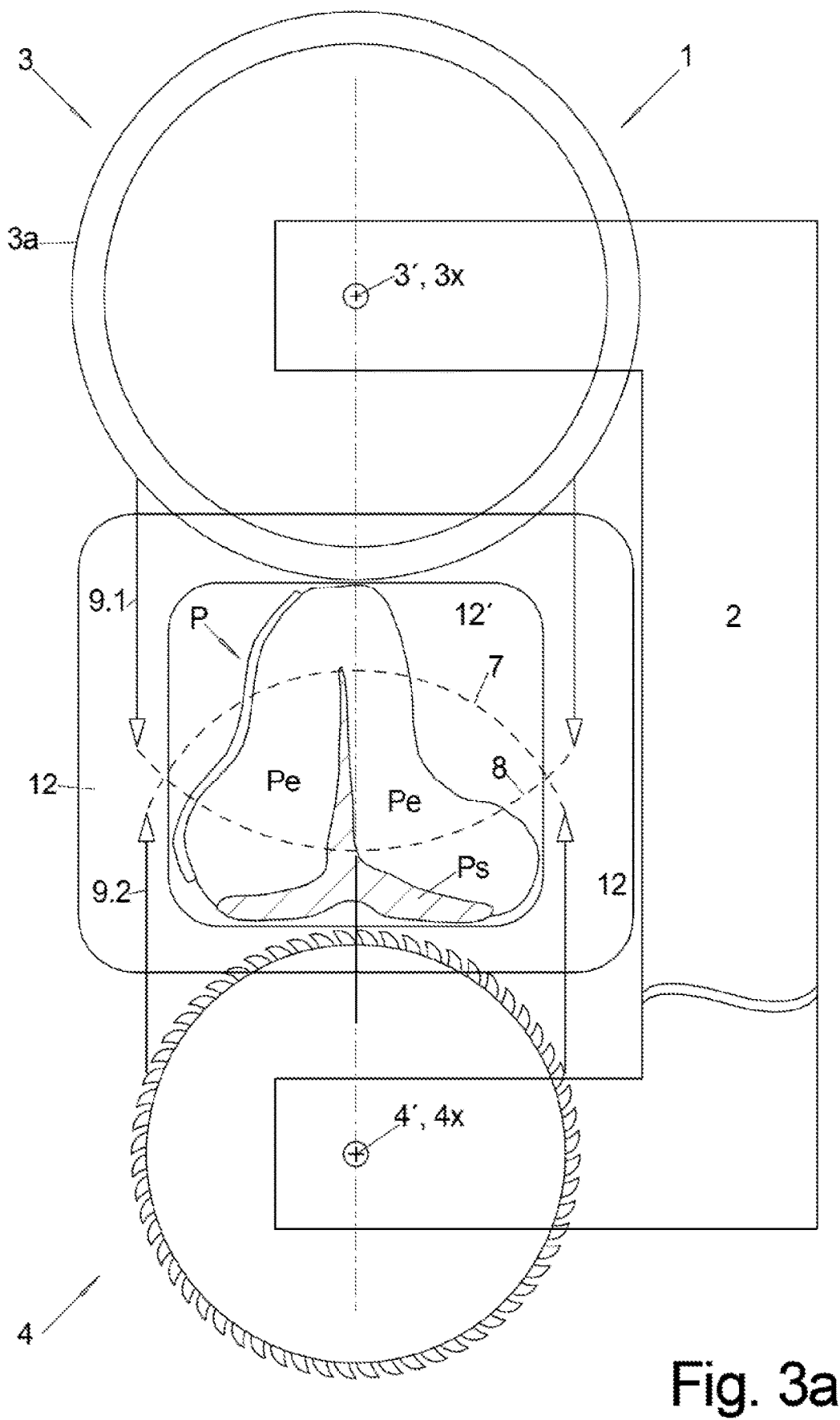

FIGS. 3a, b, c show procedures for cutting a bone-containing T-bone strand, i.e. with a bone that is T-shaped in cross-section, viewed as product P in axial direction 10.

It can be seen that the meat side of the T-bone strand, i.e. the large elastic component Pe, is approximately in contact with the upper inner surface of the rectangular cross-section of the forming tube cavity 12', the corners of which are highly rounded, and in practice is often even pressed against the rigid component Ps from below by a transverse pressing die which is not shown.

The cross section of the rigid portion Ps in FIGS. 3a, b, c is an inverted T-shape with a central trunk and a transverse leg at its free end, this approximately strip-shaped transverse leg of the rigid portion Ps being approximately horizontal and facing the lower surface of the forming tube cavity 12', while the central trunk extends from there substantially vertically upwards into the elastic portion Pe.

FIG. 3a shows an embodiment of the cutting device 1, in which at a supporting body 2 at fixed fixing positions 3x, 4x, on the one hand the blade 3 and on the other hand the saw 4 is rotatably fixed, mostly driven by a motor, whereby the supporting body 2 again has the U-shape according to FIG. 2b and the free distance between saw 4 and blade 3 again corresponds to the size of the product P and thus the forming tube cavity 12' in this direction.

For cutting, the procedure is the same as described in FIG. 2b, except that, because of the length of the leg, the saw 4 must pass through most of the cross-section of the product P in its direction of penetration 9.2, and thus also its elastic component Pe, if the rigid component Ps is to be cut completely by the saw 4.

If the central trunk of the rigid part Ps is much less hard and strong than the cross leg, and can be cut from its free end over part or even its whole length by blade 3, the saw 4 must of course be advanced much less in the direction of penetration 9.2, which drastically reduces the proportion of elastic part Pe cut.

It can also be seen here that the saw slot 7 produced by the saw 4 and the cutting slot 8 produced by the blade 3 must overlap over the entire width of the product P transversely to the two directions of penetration 9.1, 9.2, which are directed towards each other but parallel, in order to cause a slice to separate.

Figure 3B:
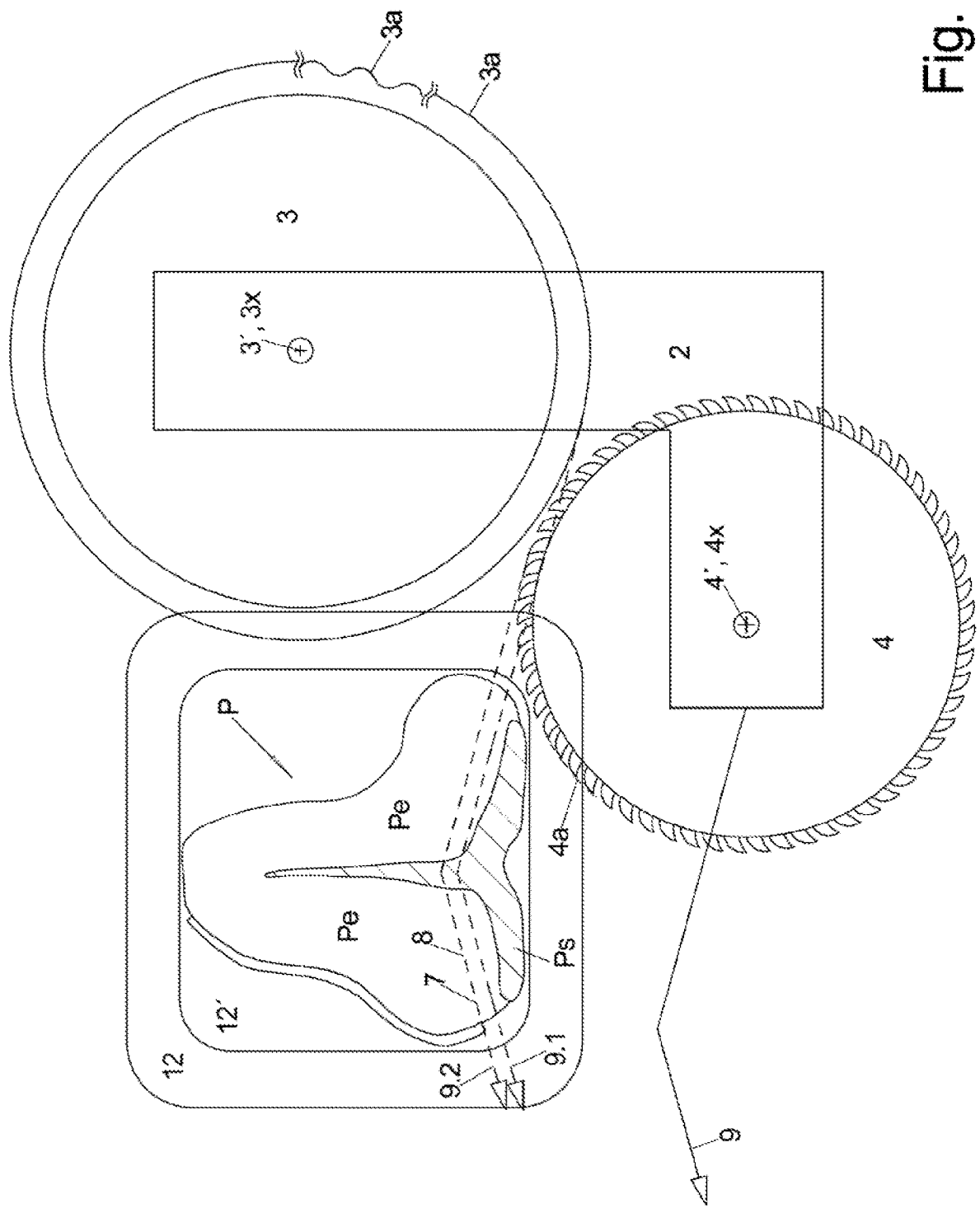

While in FIG. 3a the penetration directions 9.1, 9.2 corresponded approximately to the direction of the central trunk in the cross section of the T-shaped bone, FIG. 3b shows a solution in which the penetration directions 9,1, 9.2 of blade 3 and saw 4 are not opposite but parallel or identical, essentially transverse to the direction of extension of the central trunk of the T-shaped rigid part Ps.

Both are also preferably moved simultaneously through the product P and are located in the initial position shown in FIG. 3b to the right or right below the forming cavity 12' and thus the product P lying therein and are—which is not absolutely necessary for the invention—rotatably mounted in the free end areas of a supporting body 2 which is L-shaped in this viewing direction.

For dividing, the supporting body 2 is moved in such a direction of penetration 9 that the saw edge 4a penetrates the transverse leg of the bone from the free end, in this case the right end, and projects upwards, i.e. in the direction of the elastic component Pe, only as little as possible.

This direction of penetration 9 can rise slightly until the saw 4 reaches the central trunk in relation to the approximately horizontally arranged underside, i.e. outside, of the T-shaped bone, corresponding to the upper side of the right part of the cross-leg in this illustration, and can fall down again at an angle from the central trunk, corresponding to the upper side of the cross-section of the left part of the cross-leg.

Since the axis of rotation 3' of blade 3 is behind the axis of rotation 4' of blade 4 in this penetration direction 9, and 9 blade 3 and saw 4 slightly overlap perpendicularly to the penetration direction 9, the blade 3 completely cuts the elastic component Pe by this penetration movement and dips with its cutting edge 3a into the saw slot 7 created by the leading saw blade 4, if cutting has been started before cutting.

This again under the condition that the blade 3 can still cut the slightly rigid central trunk of the T-shaped bone, for example by means of a serrated cutting edge 3a, as indicated in FIG. 3b, which then of course preferably extends over the entire circumference.

FIG. 3c shows a solution for the same product, in which two knives 3a, b are present, which are arranged opposite each other with respect to the central trunk of the T-bone on a—in this case again U-shaped—supporting body 2, and the free distance between them is preferably at least as large as the width of the forming tube cavity 12' and thus of the product P in this direction.

The rotating saw 4 is located transversely offset to the connecting line between the axes of rotation 3' of the two blades 3a, b, in this case below the forming tube cavity 12', with its saw axis 4' mounted on the connecting leg of the U-shaped supporting body 2.

Depending on the hardness of the central trunk of the T-bone, the supporting body 2 with the blades 3a, b fixed at fixed positions 3x, 4x and the saw 4 is moved upwards in the direction of the central trunk until the saw 4 has sawn at least the transverse leg of the T-bone and the necessary subsequent portion of the central trunk.

Then the supporting body 2 is moved back, preferably against this penetration direction 9.2, until the saw 4 is completely outside the product. P, preferably outside the forming tube interior 12'.

Then the supporting body 2 is preferably moved in a direction of penetration 9.1a or b which is transverse to this direction of penetration 9.2, preferably perpendicular to it, so that one of the two blades, e.g. 3a, dips from the side into the elastic portion Pe on one side of the central trunk and cuts through it, and if necessary also at least the free end region of the central trunk. For this purpose, the blade axis 3' of this blade 3a is arranged transversely to this direction of penetration 9.1a approximately at the level of the free end of the central trunk, i.e. no further than about 20%, better only 10%, of its longitudinal extension from its free end.

Then the supporting body 2 is moved back against this direction of penetration 9.1a, and thus moved in the preferably exactly opposite direction of penetration 9.1b until the other blade 3b can penetrate the elastic portion Pe on the other side of the central trunk, cut through it as far as possible and, if necessary, also cut the free end area of the central trunk.

This solution makes it possible, depending on the structure of the T-shaped bone, to determine by the length of the penetration movement in the two penetration directions 9.1a, b, up to what proportion of the length of the central trunk of the T-bone is cut by one or both of the knives 3a, b and not by the saw 4, for which purpose, for example, one of the two knives 3a, b may have a waved or serrated edge.

FIG. 3c also shows an alternative way of moving support body 2, i.e. pivoting around a support body axis 2', which runs in axial direction 10, by means of which the two knives 3a, b can be alternately pivoted into product P by means of then arc-shaped penetration directions 9.1a, 9.1b. In this case the direction of penetration 9.2 of the saw 4 would preferably be maintained as a linear movement towards the product P, in particular towards the transverse leg of the T-bone, by the supporting body 2.

Of course, in the solutions according to FIGS. 2b, 3a, instead of a linear traverse movement, the supporting body 2 can also be oscillated back and forth about such a swivel axis running in the longitudinal direction 10 in order to bring the blade 3 and saw 4 into engagement with product P.

Figure 4:
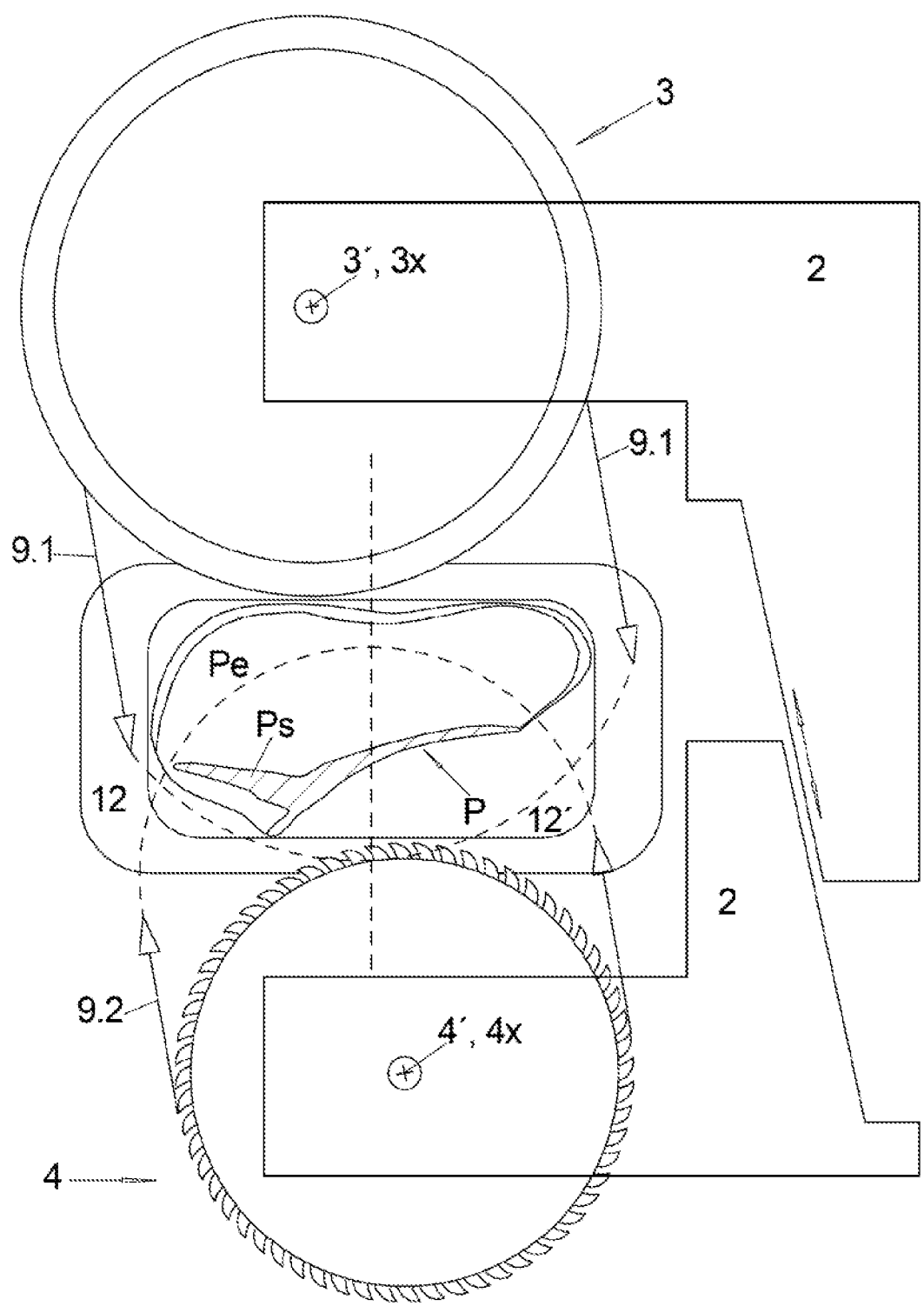
FIG. 4: a dividing device with a multi-part supporting body.

While FIGS. 2 and 3 show solutions where blade 3 and saw 4 are attached to a support body 2 at fixed mounting positions 3x, 4x relative to each other, FIG. 4 shows a solution where the mounting positions 3x, 4x can be moved relative to each other.

In this case this is possible because the supporting body 2 consists of two parts that can be moved relative to each other—in this case in the direction of the connecting line between the two axes of rotation 3', 4', which is not mandatory, however—and one of the two tools, i.e. blade 3 or saw 4, is rotatably mounted in each of the two parts.

The choice of the directions of penetration 9.1, 9.2 and/or the relative movement of the two parts of the supporting body 2 in relation to each other depends of the shape, position and principal direction of extension of the rigid component Ps and the elastic component Pe, in the sense that the blade 3 and the saw 4, and in particular the relative movement of their axes of rotation, are chosen in such a way that the saw 4 has to cut through as little of the elastic component Pe as possible to cut through the rigid component Ps.

In the figures above, both blade 3 and saw 4 are shown in a circular disk shape, but this is not absolutely necessary:

Especially blade 3 can also be sickle-shaped, i.e. have an arm running radially outwards from the rotation axis 3', on the front edge of which, facing in the direction of rotation, the cutting edge 3a is formed, and which can also be curved.

The saw 4 can also be designed in this way, then of course with teeth 4a1 on the front edge. But the saw 4 can also be a segment that can be swivelled back and forth around the saw axis 4", especially a circular segment.

LIST OF REFERENCE SIGNS

1 Dividing device
2 Supporting body
2' supporting body axis
3 blades
3' blade axis, rotation axis
3a cutting edge
3b blade body
3x fixing position
3" Cutting plane
3.1 Front side
3.2 Rear side
4 Saw
4a Saw edge
4a1, 4a2 Sawtooth
4b body saw
4x fixing position
4.1 Front side
4.2 Rear side
4' Saw axis, rotation axis
4" Saw plane
4.1" Saw slot plane
4.2" Saw slot plane
5 Sawdust bag
6 Sawdust openings
7 Saw Slot
8 Cutting slot
9, 9.1, 9.2 Penetration direction
9a, b Penetration direction
10 longitudinal direction, axial direction
11.1, 11.2 Cross direction
12 Product holder, forming pipe
13 Base frame
14 Longitudinal press punch
15 Stop plate
B width saw edge
b width of a tooth
Dm Thickness of the blade
Ds Thickness of the saw body
d Thickness of the slice
P Product
Pe elastic portion
Ps rigid portion
S Slice

The invention claimed is:

1. A dividing device for dividing a product, , which in addition to an elastic portion also has a hard, rigid portion which is less elastic than the elastic portion, , the dividing device comprising:
 a base frame;
 a blade movably attached thereto with a cutting edge;
 a saw movably attached to the base frame with a saw edge with teeth thereon, and
 a product holder attached to the base frame which is configured to hold the product,
 wherein the product holder is formed as a forming tube;
 wherein the saw is connected to the blade via the base frame;
 wherein a cutting plane of the blade and/or of the saw lies transverse to a longitudinal direction of the forming tube.

2. The dividing device according to claim 1, wherein
 the blade and the saw are arranged on a common supporting body,
 at least one of the blade or the saw is movably arranged relative to the supporting body, and/or
 the supporting body is movable relative to the base frame, which supports the supporting body.

3. The dividing device according to claim 2, wherein
 the blade and/or the saw are/is arranged rotatably, oscillatingly pivotable or linearly movable at the base frame,
 and/or
 if both the blade and the saw are movable relative to the base frame or supporting body, both can be driven independently of one another in their movement relative to the base frame or supporting body.

4. The dividing device according to claim 2, wherein fastening positions of the blade and the saw on the supporting body are adjustable relative to one another.

5. The dividing device according to claim 2, wherein the blade and the saw are designed and/or dimensioned and/or positioned, at the supporting body, in such a way that the saw penetrates the elastic portion as little as possible when sawing the rigid portion of the product.

6. The dividing device according to claim 1, wherein the cutting edge of the blade) has a waved or zigzag shape when viewed in plan view on a cutting plane.

7. The dividing device according to claim 1, wherein the blade and the saw are plate-shaped and their main planes are positioned parallel with one another.

8. The dividing device according to claim 7, wherein the blade is arranged relative to the saw in such a way that a cutting plane of the blade lies between saw slot planes of the saw.

9. The dividing device according to claim 1 comprising a plurality of the blades, wherein
 either cutting planes of the blades are identical,
 or the cutting planes of the blades are slightly spaced from each other.

10. The dividing device according to claim 9 wherein the blades have convexly curved rear sides that face a same direction.

11. The dividing device according to claim 9 wherein the cutting planes of the blades are spaced apart from each other by less than 2 mm.

12. The dividing device according to claim 9 wherein convexly curved sides of the blades point away from each other.

13. The dividing device according to claim 1 comprising a plurality of the saws,
 either a distance between saw slot planes, i.e. a width of the saw edge, is the same for all the saws and the saw slot planes are aligned with each other,
 or in the case of different widths of the saw edges, the sawing slot planes of a thinner saw are arranged between the saw slot planes of a thicker saw.

14. The dividing device according to claim 1, wherein a cutting plane of the blade is arranged between saw slot planes of the saw.

15. The dividing device according to claim 1, wherein the saw has sawdust bags in at least one of its faces or sawdust openings through a saw body of the saw.

16. A method of dividing a product, which in addition to an elastic portion also has a hard, rigid portion which is less elastic than the elastic portion, by means of a cutting device according to claim 1, the method comprising:

at least partially cutting the elastic portion with the blade; and sawing at least the rigid portion with the saw.

17. The method according to claim 16 further comprising cutting, with the blade, slightly rigid portions of the product, a rigidity of which is between that of the rigid portion and that of the elastic portion.

18. The method according to claim 17, wherein the blade has a waved or zigzag-shaped cutting edge lying in a cutting plane, and wherein cutting the slightly rigid portions is performed using the waved or zigzag-shaped cutting edge.

19. The method according to claim 16, wherein sawing on the one hand and cutting on the other hand are done
either in chronological order,
or overlapping in time.

* * * * *